Patented July 26, 1932

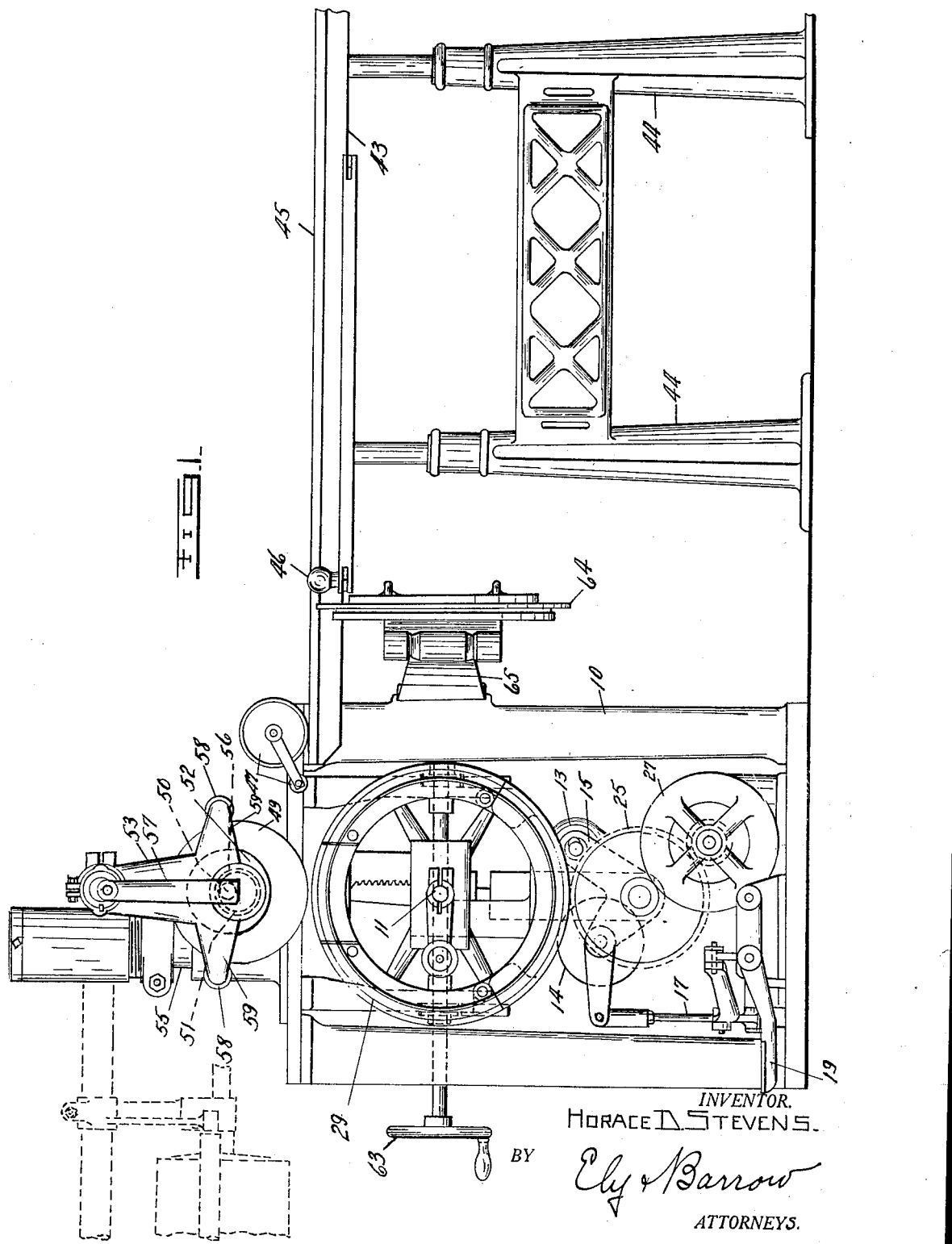

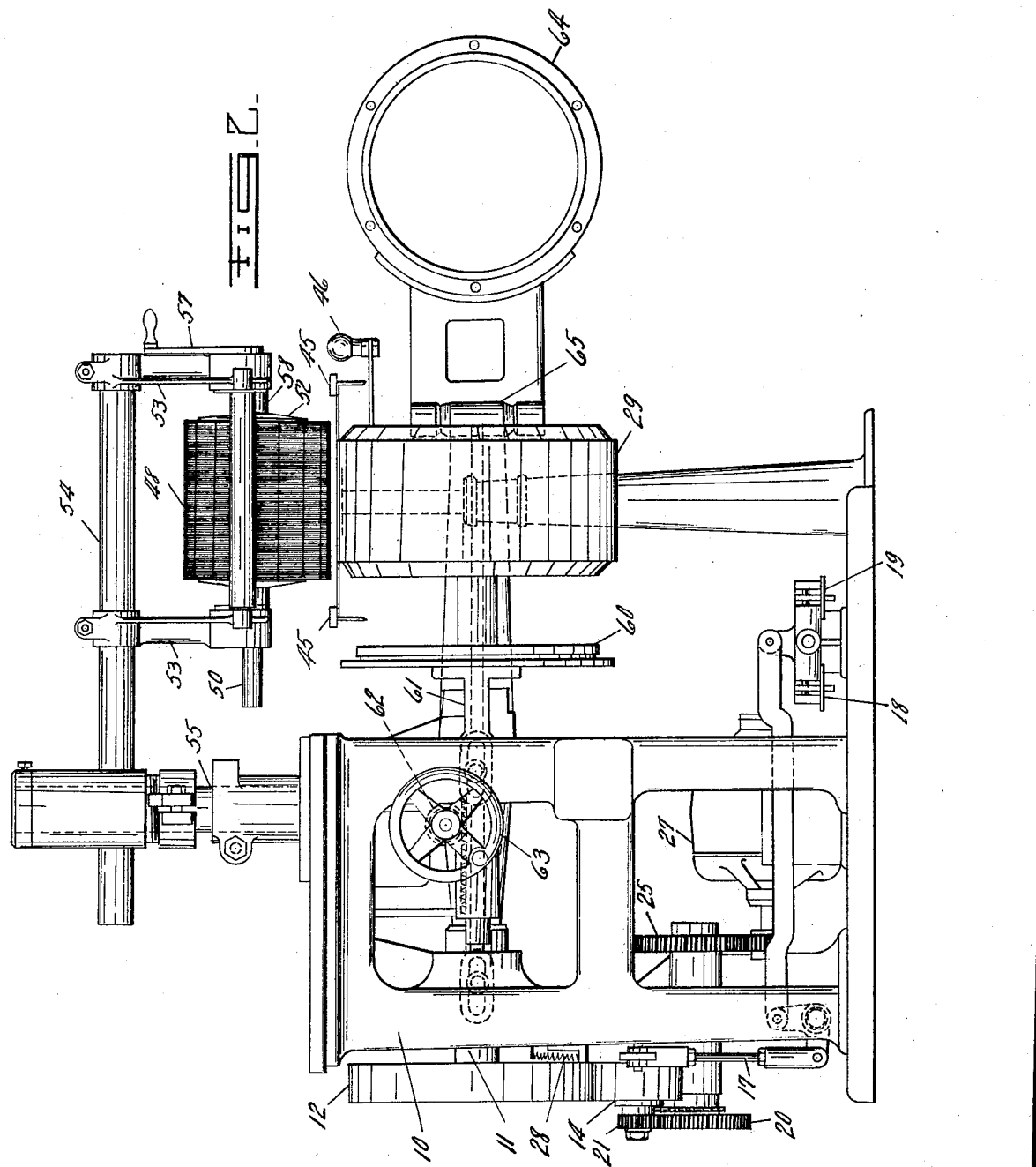

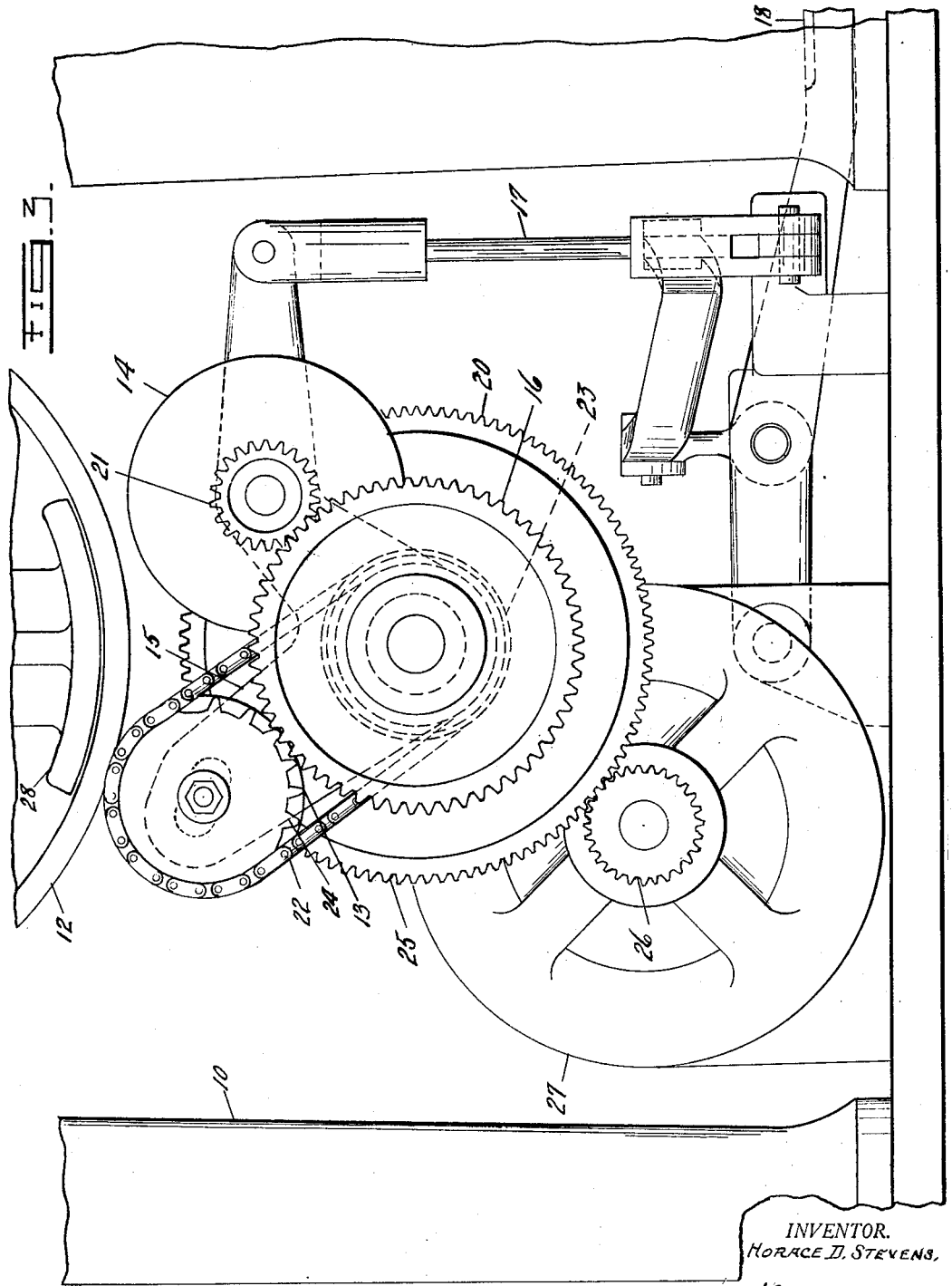

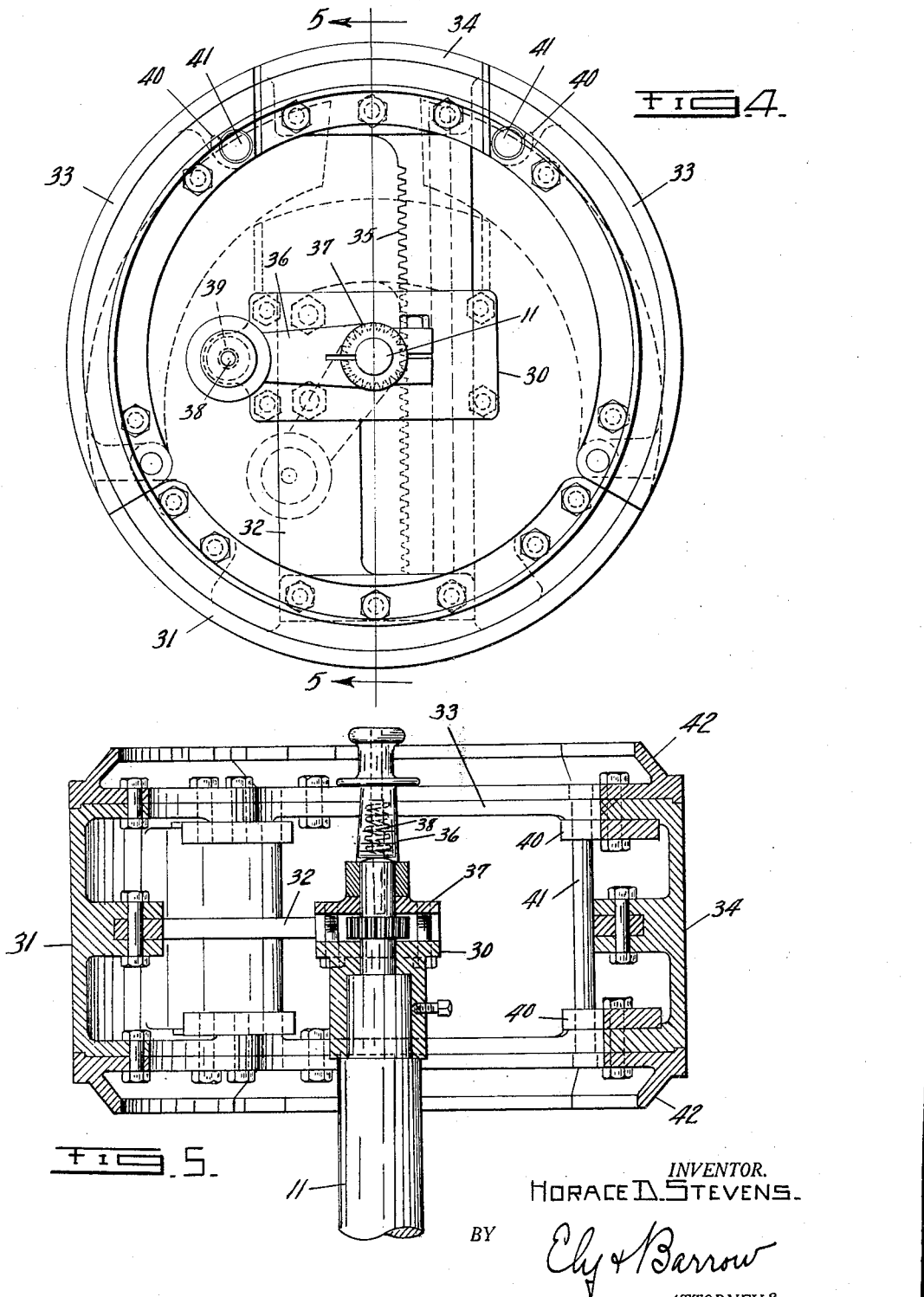

1,869,317

UNITED STATES PATENT OFFICE

HORACE D. STEVENS, OF AKRON, OHIO, ASSIGNOR TO THE FIRESTONE TIRE AND RUBBER COMPANY, OF AKRON, OHIO, A CORPORATION OF OHIO

TIRE MAKING MACHINE

Application filed December 31, 1927. Serial No. 243,865.

This invention relates to machines for making pneumatic tires, particularly to apparatus for assembling the component parts of a tire and building them up in the form of a semi-flat band.

An object of the invention is to devise a machine by means of which all of the component parts of a tire may be accurately built into a complete assembly in a semi-flat form ready for expansion to tire shape. A further object is to provide in conjunction with the above, an improved stitcher mechanism for stitching together the various plies of the casing, the beads, tread, side wall and finishing strips. Another object is to devise for use in combination with the other parts of the apparatus, a collapsible drum upon which the tire casings may be built, the drum then to be collapsed to facilitate the removal of the tire casing.

The foregoing and other objects are obtained by the apparatus illustrated in the drawings and described below. It is to be understood that the invention is not limited to the specific form thereof disclosed herein.

Of the accompanying drawings,

Figure 1 is a side elevation of a machine embodying the principles of the invention;

Figure 2 is an end elevation thereof;

Figure 3 is an enlarged scale elevational detail view of the drive mechanism;

Figure 4 is an enlarged scale elevational detail view of the collapsible drum;

Figure 5 is a transverse section taken on the line 5—5 of Figure 4; and

Figure 6:
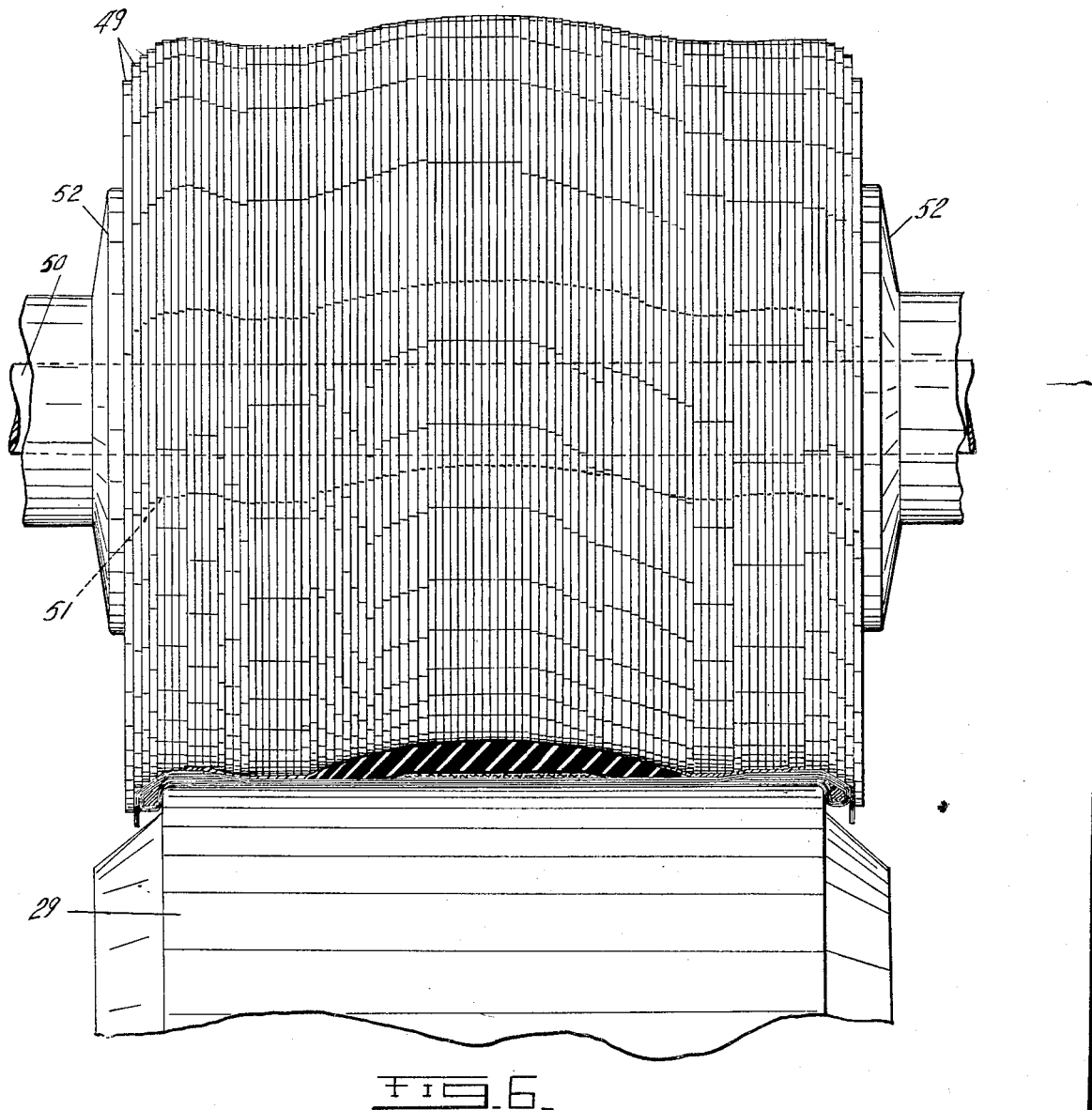
Figure 6 is an enlarged scale elevational detail view of the stitcher mechanism.

Referring to the drawings, the numeral 10 designates a frame for supporting the various elements of the tire building machine. The shaft 11, journaled in the frame, is driven by friction pulley 12, which is in turn selectively driven by either of friction wheels 13 or 14. As best shown in Figure 3, these friction wheels are journaled in a shifting bracket 15, hinged on shaft 16, and adapted to be rocked by connecting rod 17 actuated through suitable connecting means by pedals 18 and 19. Gear 20 keyed to shaft 16 meshes with pinion 21 fixed to wheel 14 to drive the latter at high speed, while a chain 22 trained over sprockets 23 and 24 respectively fixed to shaft 16 and to wheel 13, drives the latter at low speed in a reversed direction. Shaft 16 is rotated by gear 25 meshed with pinion 26 driven by motor 27 or any other suitable source of power, the directions of the driving means being such that pressing pedal 18 will cause shaft 11 to be rotated slowly in a counter-clockwise direction as viewed in Figure 1, while pressing pedal 19 will cause a rapid clockwise rotation of shaft 11. A spring-pressed brake shoe 28 is mounted on frame 10 so as normally to engage the internal surface of friction pulley 12 to prevent rotation thereof, and being constructed and arranged so that it may be disengaged when either of friction wheels 13 or 14 is brought into driving engagement with the friction pulley.

The collapsible tire building drum, denoted generally by the numeral 29 is affixed by the hub 30 thereof to the end of shaft 11 for rotation therewith, and, as shown in Figures 4 and 5, comprises a fixed segment 31 attached to hub 30 by a spoke 32, a pair of pivoted segments 33, 33 hinged to the ends of the fixed segment, and between the two last-named segments, a radially reciprocable key segment 34 supported and actuated by an attached rack 35 slidable in a slot in hub 29. Handle 36 serves to turn a pinion 37 in mesh with rack 35 to reciprocate the latter, the handle being provided with a spring-pressed pin 38 engageable in an aperture 39 in the hub to lock the handle in place when the drum is expanded to cylindrical form. Hooks 40, 40 mounted on the key segment engage pins 41, 41 mounted in the pivoted segments 32 and 33 to limit the movement of the key segment 34 when the latter is reciprocated outwardly to expand the drum. The drum is generally cylindrical on its exterior and is provided at its sides with skirt portions 42, 42 to accommodate the beads and the marginal edges of the tire building bands in the construction of tires on the drum.

A stock feeding table 43 is mounted on standards 44, 44 adjacent the drum in the plane thereof and overhanging the same. The table is of a known type having guide rails 45, 45 simultaneously movable toward and from each other by a suitable mechanism operated by handle 46, thus insuring accurate positioning of the various fabric plies, tread and other tire building strips on the drum. Further guide means may be provided, as desired, such as gauges or guide wheels 47 adapted to be swung into position across the path of the material being applied to the drum.

The stitching mechanism comprises a contour roll 48 mounted to swing about a vertical axis into position above the drum and to swing out of the way of the operator when not in use. The contour roll, detailed in Figure 6, includes a plurality of discs 49 loosely journaled on a shaft 50, the central aperture 51 in the discs being somewhat larger than the shaft so that each disc may be independently shiftable in a plane perpendicular to the shaft, and the discs being loosely assembled between collars 52, 52 so as to be freely acted upon by gravity. The mounting for the contour roll consists of a pair of hangers 53, 53 fixed to a bracket 54 pivoted about a vertical axis on a stud shaft 55 mounted on frame 10 to permit the bracket to be swung over the tire drum or out of the way when not in use. Stitcher shaft 50 is mounted in hangers 53 on eccentric bushings 56, 56 fixed to the shaft and rotatable by means of crank 57 to raise and lower the contour roll with respect to the drum. In order to limit the sidesway of stitcher discs 49, a pair of rolls 58 are mounted adjacent the latter on lateral arms 59 extending from hangers 53.

A pair of bead setting rings are mounted to cooperate with the drum for positioning and affixing beads to the tire carcass. An inner ring 60 is supported by a pair of racks 61, 61 slidable in frame 10 and reciprocable toward and from the drum by pinions 62, 62 meshing with the racks and actuated by a hand wheel 63. The outer ring 64 is pivoted about a vertical axis on bracket 65 attached to frame 10 and is adapted to be swung into position for setting a bead on the outer side of the drum.

In the operation of the machine for making tires, the inner fabric plies are centered on the stock table by means of the guide rails and are applied circumferentially about the drum, which is rotated at its slow speed, the contour roll or stitcher being swung out of the way as shown in dotted lines in Figure 1. The beads are then applied by the bead setting rings and the inner plies stitched over the beads by a hand tool or other suitable means. The outer plies, cushion strip, breaker strip tread and side walls are each applied in turn from the stock table and the whole tire assembly stitched together with the contour roll. This is accomplished by swinging said roll to a position directly above the drum and lowering the stitcher plates by turning handle 57 until the plates 49 contact with the tire as the drum is rapidly rotated. The plates are then freely acted upon by gravity to follow the contour of the tire and each plate finds its level and stitches independently of the others as shown in Figure 6. If desired, the plies and strips may be individually stitched about the drum by the contour roll after each is applied, or they may be stitched in groups, as inner plies, outer plies, and rubber covering strips. The overhanging margins of the outer fabric plies are then stitched under the beads by any suitable means to complete the tire assembly. Finally the drum is collapsed by turning handle 36 and the tire removed therefrom ready to be expanded to tire shape.

Modifications of the structure herein disclosed may be resorted to without departing from the spirit of the invention or the scope thereof as defined by the appended claims.

What is claimed is:

1. In combination with a rotatable tire building drum, a stitcher roll carriage pivoted about a vertical axis to swing over said drum, a shaft eccentrically journaled in said carriage, a stitcher roll mounted on said shaft and adapted to be raised and lowered with respect to said drum by rotation of the shaft.

2. In combination with a tire building machine including a rotatable drum, a stitcher roll pivoted about a vertical axis to swing over said drum and movable radially toward and from the drum.

3. In combination with a tire building machine including a rotatable drum, a shaft arranged to move into parallel relation to the axis of said drum, a plurality of rotatable thin edged annular discs journaled on said shaft and having individual freedom of motion transversely of the shaft, and means for moving the plurality of annular members as a whole toward said drum, said discs being independently actuated by gravity to compact a narrow circumferential area of tire building materials applied about the drum.

HORACE D. STEVENS.